No. 796,672. PATENTED AUG. 8, 1905.
A. PRIESTMAN.
APPARATUS FOR AUTOMATICALLY CONTROLLING THE FLOW OF LIQUIDS.
APPLICATION FILED DEC. 9, 1904.
3 SHEETS—SHEET 3.
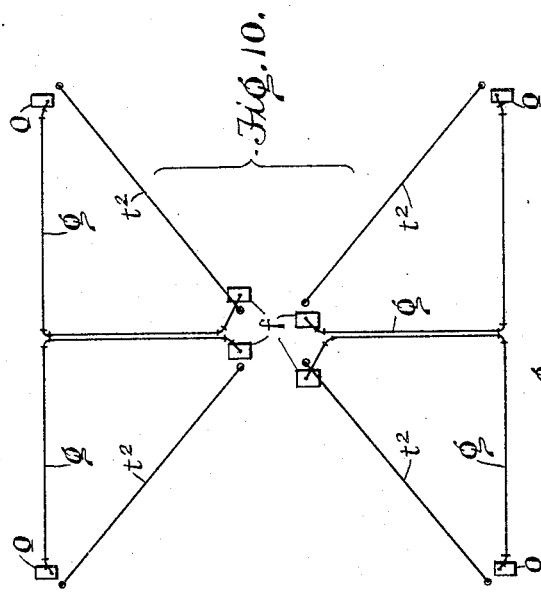
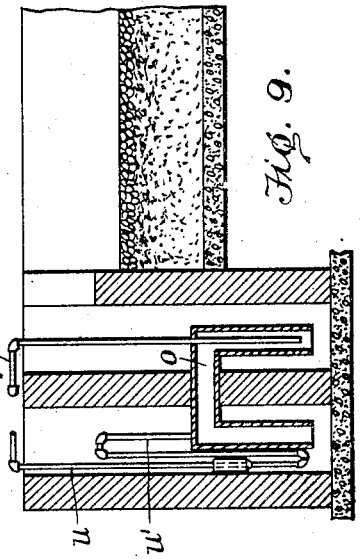
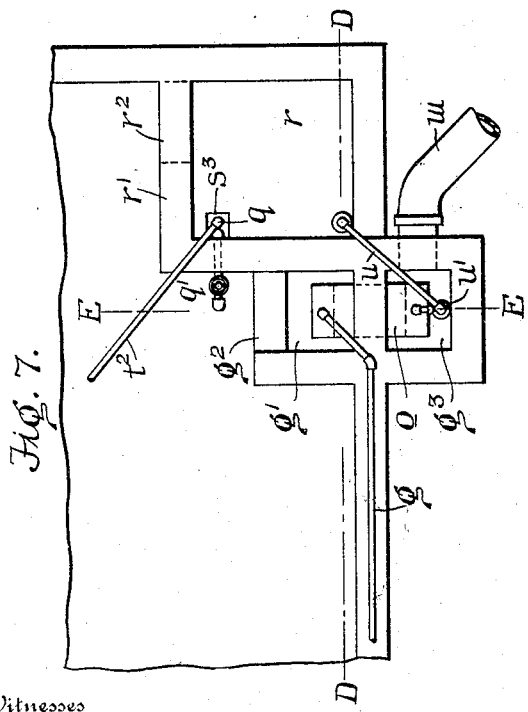
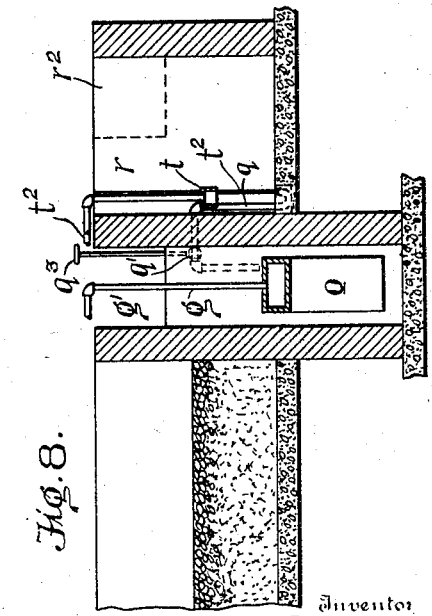
Witnesses
D. Webster Jr.
R. M. Ally
Inventor
Albert Priestman
By
Attorney ic
UNITED STATES PATENT OFFICE.

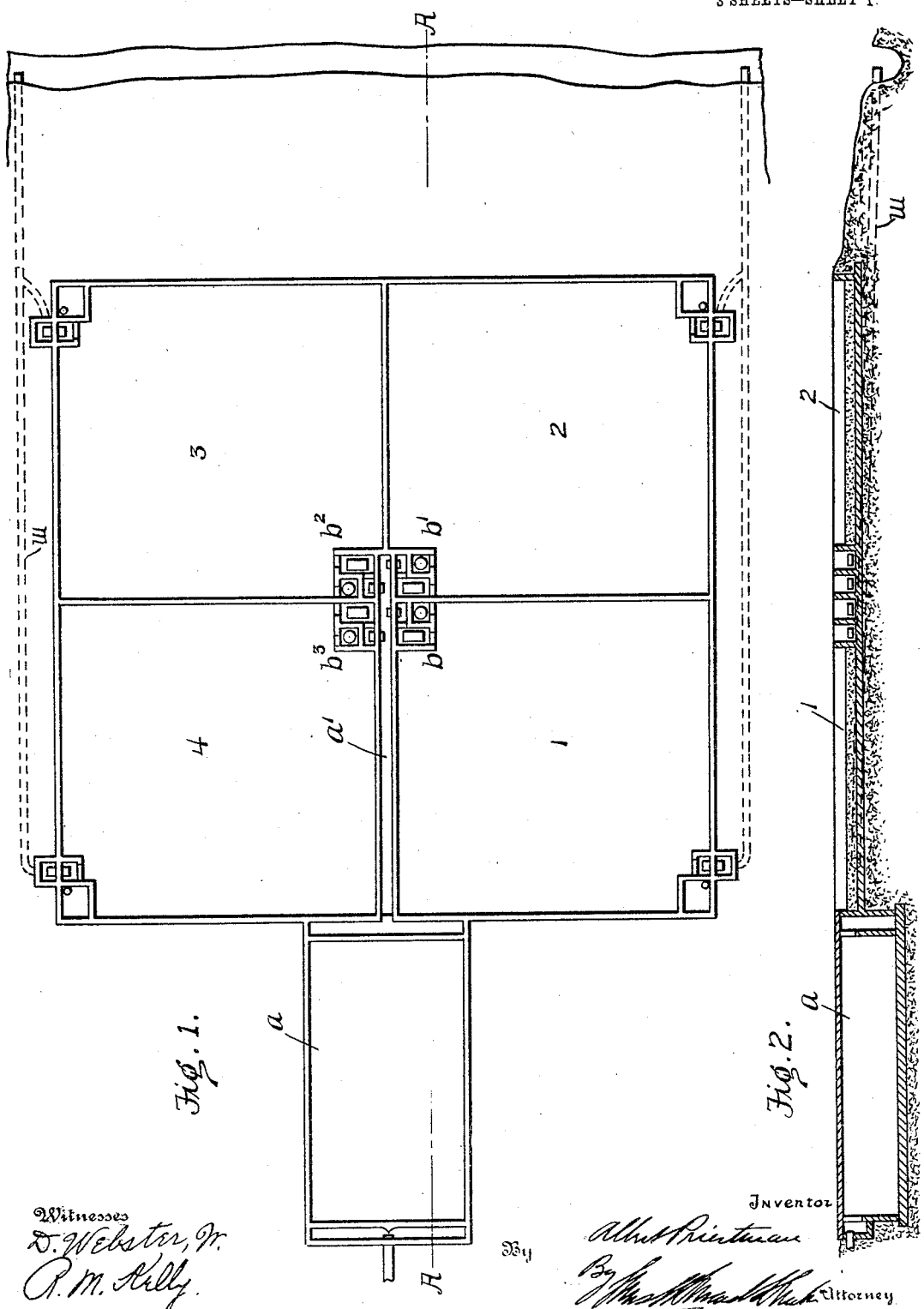

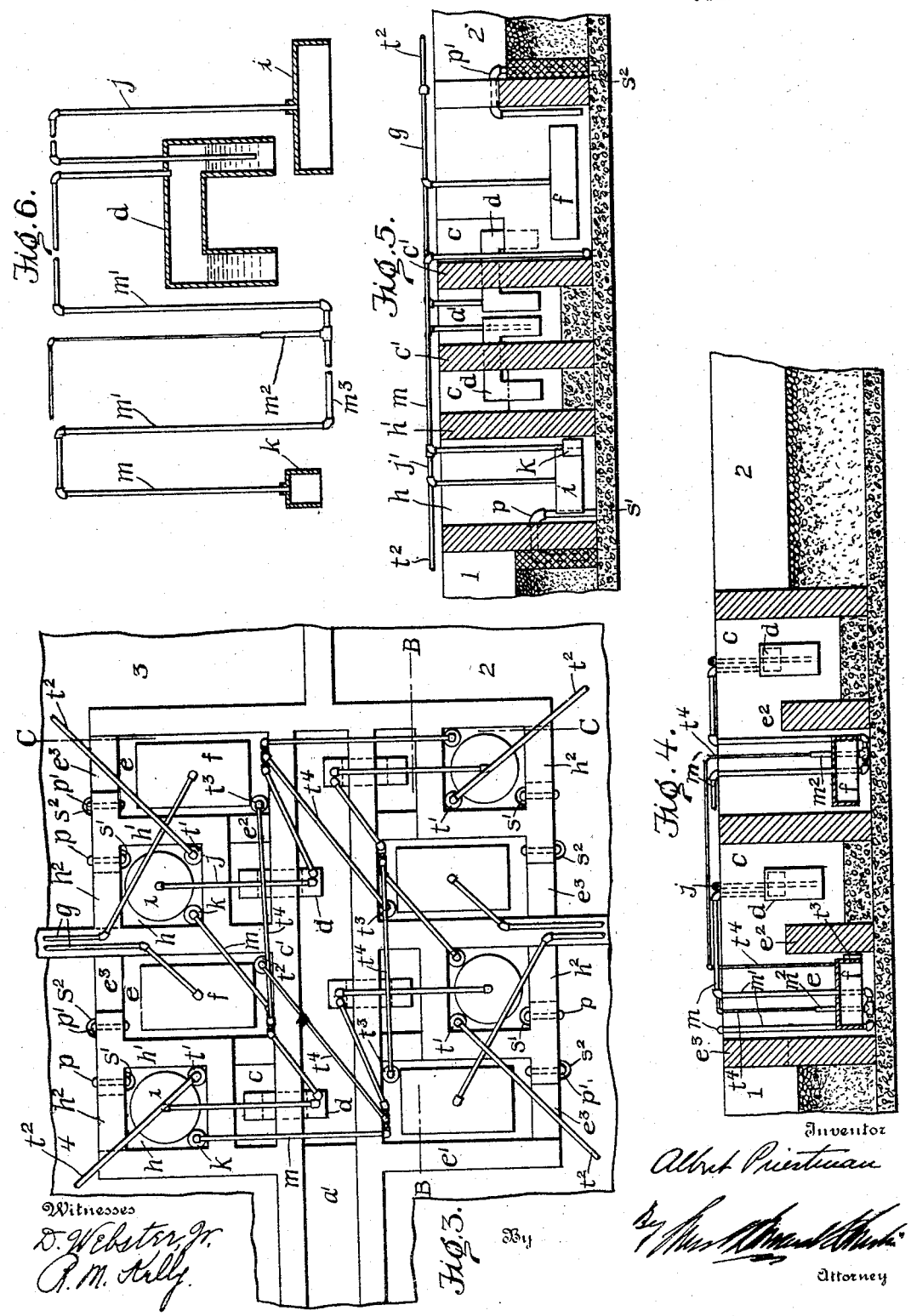

ALBERT PRIESTMAN, OF PHILADELPHIA, PENNSYLVANIA.

APPARATUS FOR AUTOMATICALLY CONTROLLING THE FLOW OF LIQUIDS.

No. 796,672.  Specification of Letters Patent.  Patented Aug. 8, 1905.

Application filed December 9, 1904. Serial No. 236,143.

*To all whom it may concern:*

Be it known that I, ALBERT PRIESTMAN, of the city and county of Philadelphia, State of Pennsylvania, have invented an Improvement in Apparatus for Automatically Controlling the Flow of Liquids, of which the following is a specification.

In a former patent, No. 749,825, dated January 19, 1904, I have described and shown a system of automatically-controlled filtering-beds, in which the flow of the liquid into one filtering-tank automatically closes the outlet from that tank, and after the liquid in that tank reaches a certain level it automatically closes the inlet to that tank and opens the inlet to the next tank in the series, and in which also the liquid automatically opens the outlet from the first tank after a given period of time, these operations being performed successively in a series of tanks.

In practical applications of systems of filtration the volume of sewage supplied is variable and at times, as during the night, may practically cease. It is important, therefore, that any system of automatic control should respond automatically to such changes in volume.

The present invention is designed to accomplish this result in a system of the character described in my said Letters Patent and relates to certain improvements, which are fully set forth hereinafter.

In the drawings, Figure 1 is a plan view illustrating a system of filtering-beds of the character to which my improvements are applied. Fig. 2 is a longitudinal sectional view of the same on the line A A of Fig. 1. Fig. 3 is an enlarged plan view of the controlling devices adjacent to the inlets of the filtering-beds. Fig. 4 is a longitudinal section on the line B B of Fig. 3. Fig. 5 is a transverse section on the line C C of Fig. 3. Fig. 6 is a diagram of the devices for sealing and unsealing the inlet-pipe. Fig. 7 is a plan view, enlarged, of the outlet devices. Fig. 8 is a longitudinal section on the line D D of Fig. 7. Fig. 9 is a transverse section on the line E E of Fig. 7, and Fig. 10 is a diagram illustrating the arrangement of the devices for controlling the outlet.

In a system of the general character illustrated the sewage flows from a suitable source such as a septic-tank $a$, through a suitable conduit $a'$ to the feed devices $b\ b'\ b^2\ b^3$, each of which controls the supply of sewage to one of the tanks 1 2 3 4. These feed devices consist each of an inverted-U-shaped pipe $d$, extending through the wall $c'$ and having one open leg in the conduit $a'$ and the other in a chamber $c$, which communicates with a second chamber $e$ through a weir $e^2$. The chamber $e$ is inclosed by the walls $e'$ and communicates with the filtering-bed through a weir $e^3$. In the chamber $e$ is an inverted bell $f$, from which an air-pipe $g$ leads to the outlet-controlling devices of the tank.

$g'$ is a chamber adjacent to the outlet communicating with the filtering-bed through a weir $g^2$.

$o$ is an inverted-U-shaped outlet-pipe extending through the wall of the chamber $g$ and having one open leg in said chamber and the other in the outlet-chamber $g^3$, which communicates with the discharge-main $w$.

When the liquid in the tank reaches a proper height, it will pass over the weir $g^2$ into the chamber $g'$, and if its passage is not otherwise prevented it will flow out through pipe $o$. The air-pipe $g$ extends down into the inlet-leg of the pipe $o$, as shown in Fig. 9, and consequently as the liquid rises in the chamber $e$ the air compressed in the bell $f$ will be forced through the pipe $g$ into the upper part of the pipe $o$ and will form an air seal to prevent the outflow of liquid. Thus the outlet from each tank will be closed as soon as the inlet is opened, and the liquid flows in through $d$ into the chamber $e$.

To close the inlet $d$ when the corresponding tank is filled to the proper level, the following devices are used: $h$ is a chamber divided by walls $h'$ from the chambers $c$ and $e$ and the filtering-tank and has communication with the tank through an inverted-U-shaped pipe $p$, extending through the wall $h'$. In this chamber $h$ is an inverted bell $i$, having a pipe $j$, leading to the inlet-leg of the supply-pipe $d$. When the liquid reaches the proper level in the filtering-tank, it will flow through the pipe $p$ into the chamber $h$ and rising therein will compress the air in the bell $i$ and force air through the pipe $j$ into the feed-pipe $d$ and air-bind it, thus closing the supply. To automatically open the supply to the next tank when the supply to the first is thus closed, the second and smaller bell $k$ in the chamber $h$ is employed. This bell communicates, through a pipe $m$, with the inlet-leg of the supply-pipe $d$ to the next tank. The pipe $m$ has a U-bend $m'$ located for convenience in the chamber $e$ of the second tank and provided with an open upright portion $m^2$. Supposing the inlet $d$ to any tank to have been closed by the formation of the air seal in the manner described, it will result that when the liquid rises in the chamber $h$ of any tank and closes the inlet to that tank through the compression of air in the bell $i$ it will also compress air in the bell $k$, and the air thus forced through the pipe $m$ will displace a column from $m^2$, breaking the air seal in the inlet $d$ to the next tank. When the liquid is thus displaced from the pipe $m^2$, the column in $m'$ on the side adjacent to the inlet $d$ will run down into the other portions of the pipe, and in order to insure the unsealing of the inlet $d$ it is necessary that sufficient space shall be provided to receive this liquid and prevent it rising into the upright portions of the pipes $m'$ $m^2$ $m'$ and sealing them. For this purpose I provide the horizontal section $m^3$, Fig. 6, which has sufficient capacity to receive the liquid column from the pipe $m'$ without causing it to rise into and seal the upright portions.

To open the outlet after the liquid had remained in the tank for a given length of time, the following devices are employed: $r$ is a chamber divided by walls $r'$ from the tank and outlet-chamber $q'$, which communicates with the tank through an inverted-U-shaped pipe $q$. The chamber $r$ is provided with a small inverted bell $t$, from which leads a pipe $u$, projecting into the open end of a siphon $u'$, leading from the outlet-leg of the discharge-pipe $o$.

If desired, an arrangement of relief-pipes similar to that shown in Fig. 6 may be employed for opening the outlet or discharge pipe $o$.

When the liquid flowing through the pipe $q$ into the chamber $r$ reaches the proper level, it will compress air in the bell $t$. The air thus forced through the pipe $u$ will displace a column from the siphon $u'$ and break the air seal in the outlet-pipe $o$. The flow through the pipe $q$, and consequently the length of time before the outlet is opened, may be controlled by a suitable valve $q'$.

$p'$ is an inverted-U-shaped pipe between the chamber $e$ and filtering-tank to drain the chamber when the tank empties.

So far as the apparatus has been described it is exactly of the form shown in my Letters Patent No. 749,825, and this description has here been made for the purpose of rendering my present improvements intelligible.

As the level of the liquid in chamber $r$ determines the time of the opening of the outlet from the filtering-tank and as the level of the liquid in chamber $h$ determines the time of closing the inlet to that tank and of opening the inlet to the next, it is obvious that chamber $r$ should not fill to the operative level before the corresponding chamber $h$ has filled, since in that case the liquid would begin to flow out of the tank before the inlet was closed and before the supply to the next tank was opened, and as the chamber $r$ is supplied from the tank there must be a sufficient volume of liquid in the tank to supply that chamber when the chamber $h$ is filled and the inlet closed. Otherwise sufficient liquid could not be supplied to the chamber from the tank to open the outlet. As the closing of outlet $o$ depends upon the level of the liquid in the chamber $e$, it is necessary that a flow from the chamber $e$ to the tank through the pipe $p'$ shall not take place until the chamber $e$ has filled to the required level to close the outlet. To accomplish these objects, I provide a seal on the discharge side of each of the pipes $p$, $p'$, and $q$, the seal for the pipes $p$ and $q$ being in the chambers $h$ and $r$, respectively, and that for the pipe $p'$ in the filtering-tank. This seal may be conveniently formed by extending the discharge-legs of the pipes $p$, $p'$, and $q$ and submerging them in suitable water-pockets or sumps $s'$ $s^2$ $s^3$, respectively.

In Fig. 5 the pipe $p$ of tank No. 1 is shown submerged in sump or pocket $s'$ in the tank and the pipe $p'$ of tank No. 3 is shown similarly submerged in sump or pocket $s^2$ in the chamber $h$. It is apparent that there can be no outflow of liquid from the chamber $e$ through the pipe $p'$ into the tank until the level of the liquid in $e$ has reached a sufficient level to break the seal formed by the pocket or sump $s^2$ and until it has compressed the air in the bell $f$ and closed the outlet. So, also, there can be no flow of liquid from the tank through the pipe $p$ into the chamber $h$ until the level of the liquid in the tank is sufficient to break the seal formed by the pocket or sump $s'$, and consequently the bells $i$ and $k$ cannot operate to close and open their respective feed-pipes before a proper liquid-level has been attained in the tank.

In Figs. 7 and 8 the pipe $q$ is shown projected into a sump or pocket $s^3$ in the tank $r$; but in this case I prefer to provide the discharge end of said pipe with a U-bend. It is apparent that the liquid cannot flow from the tank through the pipe $q$ into the chamber $r$ and operate the bell $t$ to open the outlet-pipe $o$ until a sufficient level of liquid has been attained in the tank to break the seal in the pipe $q$. Similar U-bends may, if desired, be used with the pipes $p$ and $p'$. When the liquid-level in the tank falls so low that the depth covering the ends of the pipes $p$, $p'$, and $q$ on the tank side is less than the heads in the chambers $e$, $h$, and $r$, the liquid will be free to flow from the chambers into the filtering-tank. The release of the seals in the pipes $p$, $p'$, and $q$ may also be effected pneumatically. For example, I have shown a small bell $t'$ in the chamber $h$, from which a pipe $t^2$ leads to the seal formed in the U-bend of the pipe $q$, so that when the proper level of liquid has been attained in the chamber $h$ to close the inlet to that filtering-tank and open the inlet to the next it compresses air in the bell $t'$. The air thus forced through the pipe $t^2$ will eject a column of liquid from the U-bend in the pipe $q$ and break the seal, allowing the liquid to flow from the filtering-tank into the chamber $r$. In some cases the pipes $q$ and $p$ may be used only for emptying the chambers $r$ and $h$. In such cases the walls of the chambers $h$ and $r$ may be provided with weirs $h^2$ and $r^2$ to permit the liquid to flow by gravity into the chambers, (see dotted lines in Figs. 3, 7, and 8,) and the seals $s^2$ and $s^3$ may be used simply to prevent the flow of liquid into the chambers, the flow from the chambers taking place when the level in the tank falls sufficiently to permit the head in the chambers to force the seals. It sometimes happens that there is such an excessive flow of sewage in the conduit $a'$ that it is desirable to open the inlet to a second tank before the first tank is filled, allowing two or more tanks to fill simultaneously. For this purpose I employ a small bell $t^3$ in the chamber $e$, having an air-pipe $t^4$ projecting part way into the upright pipe $m^2$ of the relief-pipe $m$ to the inlet $d$ of the next filtering-bed in advance. The air forced through the pipe $t^4$ from the bell $t^3$ will displace a portion of the water from the pipe $m^2$, which will not, however, break the air seal in the inlet-pipe $d$, but merely weaken it to such an extent that the increased head of the sewage in the conduit $a'$ will force the air seal and flow into the second filtering-tank before the inlet to the first tank is closed by the bell $i$ and before the inlet to the second tank would be opened under normal conditions by the bell $k$.

What I claim as new, and desire to secure by Letters Patent, is as follows:

1. In apparatus for automatically controlling the flow of liquids, the combination with the tank to receive the liquid, of a liquid-outlet pipe, means controlled by the rising liquid at the point of entering said tank to air-bind the outlet-pipe when the liquid commences to enter, means controlled by the rise of the liquid adjacent to said outlet to unseal said outlet-pipe, and a pipe to control the passage of liquid between said tank to the means to unseal said outlet-pipe, having a water seal on the side adjacent to said means to unseal said outlet-pipe, whereby the liquid cannot pass from said tank to said means to unseal the outlet until sufficient head is attained in said tank to force the water seal.

2. In apparatus for automatically controlling the flow of liquids, the combination with the tank to receive the liquid, a liquid-outlet pipe, means controlled by the rising liquid at the point of entering said tank to air-bind the outlet-pipe when the liquid commences to enter, means controlled by the rise of the liquid adjacent to said outlet, to unseal said outlet-pipe, a pipe to control the passage of liquid between said tank to the means to unseal said outlet-pipe, having a water seal on the side adjacent to said means to unseal said outlet-pipe, whereby the liquid cannot pass from said tank to said means to unseal the outlet until sufficient head is attained in said tank to force the water seal, and means controlled by the level of the liquid in a chamber outside of said tank but communicating therewith to break the water seal in said pipe between the tank and means to unseal the outlet.

3. In apparatus for automatically controlling the flow of liquids, the combination with the tank to receive the liquid, of an outlet-pipe, means controlled by the level of the liquid at the point of entering the tank, to air-bind said outlet-pipe, an outlet-controlling chamber, means controlled by the level of the liquid in said outlet-controlling chamber to unseal said outlet-pipe, and a liquid-feed pipe between the tank and outlet-chamber having a water seal on the outlet-chamber side.

4. In apparatus for automatically controlling the flow of liquids, the combination with the tank to receive the liquid, of an outlet-pipe for the discharge of liquid from the tank, an outlet-controlling chamber, means controlled by the level of the liquid in said outlet-controlling chamber to control said outlet-pipe, and a liquid-feed pipe between the tank and outlet-chamber having a water seal on the outlet-chamber side.

5. In apparatus for automatically controlling the flow of liquids, the combination with the tank to receive the liquid, of an outlet-pipe for the discharge of liquid from the tank, an outlet-controlling chamber, means controlled by the level of the liquid in said outlet-controlling chamber to control said outlet-pipe, a liquid-feed pipe between the tank and outlet-chamber having a water seal on the outlet-chamber side, and means controlled by the level of the liquid in a chamber outside of said tank but communicating therewith to break the water seal in said feed-pipe.

6. In apparatus for automatically controlling the flow of liquids, the combination with the tank to receive the liquid, of an inlet-pipe for the supply of liquid and an outlet-pipe for the discharge of liquid from said tank, an outlet-controlling chamber, means controlled by the level of the liquid in said outlet-controlling chamber to control said outlet, an inlet-controlling chamber, means controlled by the level of the liquid in said inlet-controlling chamber to control the inlet-pipe, a feed-pipe between the tank and outlet-chamber, having a water seal on the chamber side, and means controlled by the level of water in the inlet-controlling chamber for controlling said water seal.

7. In apparatus for automatically controlling the flow of liquids, the combination with the tank to receive the liquid, of an inlet-pipe for the supply of liquid and an outlet-pipe for the discharge of liquid from said tank, an outlet-controlling chamber, means controlled by the level of the liquid in said outlet-controlling chamber to control said outlet, an inlet-controlling chamber, means controlled by the level of the liquid in said inlet-controlling-chamber to control the inlet-pipe, a feed-pipe between the tank and outlet-chamber, having a water seal on the chamber side, a bell in said inlet-controlling chamber, and an air-pipe leading from said bell to the water seal in the feed-pipe between the tank and outlet-chamber.

8. In apparatus for automatically controlling the flow of liquids, the combination with the tank to receive the liquid, of an inlet-pipe for the supply of liquid and an outlet-pipe for the discharge of liquid from said tank, an outlet-controlling chamber, means controlled by the level of the liquid in said outlet-controlling chamber to control said outlet, an inlet-controlling chamber, means controlled by the level of the liquid in said inlet-controlling chamber to control the inlet-pipe, a feed-pipe between the tank and outlet-chamber, having a water seal on the chamber side, and a feed-pipe between the tank and inlet-chamber also having a water seal on the chamber side.

9. In apparatus for automatically controlling the flow of liquids, the combination with the tank to receive the liquid, of an outlet-pipe for the discharge of liquid from the tank, a chamber between the supply-inlet and the tank, means in said chamber controlled by the level of the liquid therein to control said outlet-pipe, and a feed-pipe between said chamber and the tank having a water seal on the tank side.

10. In apparatus for automatically controlling the flow of liquids, the combination with the tank to receive the liquid, of an inlet-pipe, an inlet-controlling chamber, means controlled by the level of the liquid in said chamber to control the inlet-pipe, and a feed-pipe between said inlet-controlling chamber and the tank having a water seal on the inlet-controlling chamber side.

11. In apparatus for automatically controlling the flow of liquids, the combination of two tanks to receive the liquid in succession, an inlet-pipe to each of said tanks, an inlet-controlling chamber in the first tank, means controlled by the level of the liquid in said chamber to seal the inlet-pipe to the first tank and unseal the inlet-pipe to the second tank, and a feed-pipe between said inlet-controlling chamber and the first tank having a water seal on the chamber side.

12. In apparatus for automatically controlling the flow of liquids, the combination of two tanks to receive the liquid in succession, an inlet-pipe to each of said tanks, means controlled by the level of the liquid in the first tank to seal the inlet-pipe to that tank, means also controlled by the level of the liquid in the first tank to unseal the inlet-pipe to the second tank, and means controlled by the level of the liquid adjacent to the inlet of the first tank for controlling the said means for unsealing the inlet-pipe to the second tank.

13. In apparatus for automatically controlling the flow of liquids, the combination of two tanks to receive the liquid in succession, an inlet-pipe to each of said tanks, an inlet-controlling chamber in the first tank, means controlled by the level of the liquid in said chamber to unseal the inlet-pipe in the second tank, and means controlled by the level of the liquid adjacent to the inlet of the first tank to control said means for unsealing the inlet-pipe to the second tank.

14. In apparatus for automatically controlling the flow of liquids, the combination of two tanks to receive liquids in succession, an inlet-pipe to each of said tanks, an inlet-controlling chamber at the first tank, a bell in said chamber, an air-pipe leading from said bell to the inlet-pipe to the second tank and having a water seal, and means controlled by the level of the liquid adjacent to the inlet of the first tank to control said water seal.

15. In apparatus for automatically controlling the flow of liquids, the combination of two tanks to receive liquid in succession, an inlet-pipe to each of said tanks, an inlet-controlling chamber at the first tank, a bell in said chamber, an air-pipe leading from said bell to the inlet-pipe to the second tank and having a water seal, a bell adjacent to the inlet of the first tank, and an air-pipe leading from said bell to the water seal in the air-pipe leading to the inlet-pipe of the second tank.

16. In apparatus for automatically controlling the flow of liquids, the combination of a series of tanks adapted to receive the liquid in succession, inlet-pipes to each of said tanks, outlet-pipes from each of said tanks, a chamber adjacent to each inlet and receiving liquid therefrom, means controlled by the level of the liquid in each of said inlet-chambers to seal the outlet of the corresponding tank, an outlet-controlling chamber for each tank, means controlled by the level of the liquid in each of said outlet-controlling chambers to unseal the outlet of the corresponding tank, an inlet-controlling chamber for each tank, means controlled by the level of the liquid in each inlet-controlling chamber to seal the inlet-pipe to the corresponding tank, means also controlled by the level of the liquid in said inlet-controlling chambers to unseal the inlet-pipes to the next tanks, feed-pipes between each tank and its inlet, inlet-controlling and outlet-controlling chambers, said pipes having water seals located on the tank side of the feed-pipe to the inlet-chamber, and on the chamber side of the feed-pipes to the inlet-controlling and outlet-controlling chambers.

17. In apparatus for automatically controlling the flow of liquids, the combination of a series of tanks adapted to receive the liquid in succession, inlet-pipes to each of said tanks, outlet-pipes from each of said tanks, a chamber adjacent to each inlet and receiving liquid therefrom, means controlled by the level of the liquid in each of said inlet-chambers to seal the outlet of the corresponding tank, an outlet-controlling chamber for each tank, means controlled by the level of the liquid in each of said outlet-controlling chambers to unseal the outlet of the corresponding tank, an inlet-controlling chamber for each tank, means controlled by the level of the liquid in each inlet-controlling chamber to seal the inlet-pipe to the corresponding tank, means also controlled by the level of the liquid in said inlet-controlling chambers to unseal the inlet-pipes to the next tanks, feed-pipes between each tank and its inlet, inlet-controlling and outlet-controlling chambers, said pipes having water seals located on the tank side of the feed-pipe to the inlet-chamber, and on the chamber side of the feed-pipes to the inlet-controlling and outlet-controlling chambers, and means controlled by the level of the liquid in the inlet-controlling chamber for breaking the water seal in the feed-pipe between the corresponding tank and its outlet-controlling chamber.

18. In apparatus for automatically controlling the flow of liquids, the combination of a series of tanks adapted to receive the liquid in succession, inlet-pipes to each of said tanks, outlet-pipes from each of said tanks, a chamber adjacent to each inlet and receiving liquid therefrom, means controlled by the level of the liquid in each of said inlet-chambers to seal the outlet of the corresponding tank, an outlet-controlling chamber for each tank, means controlled by the level of the liquid in each of said outlet-controlling chambers to unseal the outlet of the corresponding tank, an inlet-controlling chamber for each tank, means controlled by the level of the liquid in each inlet-controlling chamber to seal the inlet-pipe to the corresponding tank, means also controlled by the level of the liquid in said inlet-controlling chambers to unseal the inlet-pipes to the next tanks, feed-pipes between each tank and its inlet, inlet-controlling and outlet-controlling chambers, said pipes having water seals located on the tank side of the feed-pipe to the inlet-chamber, and on the chamber side of the feed-pipes to the inlet-controlling and outlet-controlling chambers, and means controlled by the level of the liquid in the inlet-chambers for controlling the means for unsealing the inlet-pipes to the next tanks from the inlet-controlling chambers of the previous tanks.

19. In apparatus for automatically controlling the flow of liquids, the combination of a liquid pipe or passage, means to air-bind and close said pipe or passage, means controlled by the rise of the liquid to relieve the air in said liquid pipe or passage consisting of an air-bell, an air-pipe leading from said air-bell to said pipe or passage and having a water seal provided with an open upright pipe, through which water may be discharged from said water seal by the air-pressure from said bell, said water seal having a receptacle in addition to its upright portions of a capacity sufficient to receive the column of liquid on the side of said water seal adjacent to the liquid pipe or passage.

In testimony of which invention I hereunto set my hand.

ALBERT PRIESTMAN.

Witnesses:
ERNEST HOWARD HUNTER,
R. M. KELLY.